United States Patent

Sonobe et al.

[11] Patent Number: 5,863,631
[45] Date of Patent: Jan. 26, 1999

[54] PERPENDICULAR MAGNETIC RECORDING MEDIUM AND MAGNETIC RECORDING DEVICE USING THE SAME

[75] Inventors: Yoshiaki Sonobe, Fujisawa; Yoshihiro Ikeda, Yokohama; Hiroshi Uchida, Sagamihara; Takashi Toyooka, Kawasaki; Yoshiuki Tagashira, Machida, all of Japan

[73] Assignee: International Business Machines Corporation, Armonk, N.Y.

[21] Appl. No.: 813,017

[22] Filed: Mar. 6, 1997

[51] Int. Cl.$^6$ ........................................... G11B 5/66
[52] U.S. Cl. .................... 428/65.3; 428/65.7; 428/694 T; 428/900; 360/128; 360/135
[58] Field of Search ............................ 428/694 T, 900, 428/65.3, 65.7; 360/128, 135

[56] References Cited

U.S. PATENT DOCUMENTS

| | | | |
|---|---|---|---|
| 4,761,334 | 8/1988 | Sagoi | 428/332 |
| 4,814,239 | 3/1989 | Inoue | 428/694 TM |
| 4,824,539 | 4/1989 | Komoda | 204/192.2 |
| 4,999,220 | 3/1991 | Honda | 427/132 |
| 5,068,158 | 11/1991 | Futamoto | 428/684 TS |
| 5,413,868 | 5/1995 | Matsubaguchi | 428/457 |
| 5,525,398 | 6/1996 | Takai | 428/141 |
| 5,587,235 | 12/1996 | Suzuki | 428/332 |
| 5,589,262 | 12/1996 | Kiuchi | 428/336 |

Primary Examiner—Leszek Kiliman
Attorney, Agent, or Firm—Thomas R. Berthold

[57] ABSTRACT

A perpendicular magnetic recording medium wherein a perpendicular magnetic film is formed on a substrate or a nonmagnetic film, and the perpendicular magnetic film contains Co and Cr, the content of the Cr being 22 at. % or higher but 30 at. % or less. The medium is used in a magnetic recording disk drive using a magnetoresistive read head.

2 Claims, 6 Drawing Sheets

Dependence of S/N ratio and output on Pt content when Pt is added in a $Co_{72}Cr_{28}$ medium Dependencies of the output and S/N on the Cr content $Hc_\perp$ and Ms dependencies on the Cr content

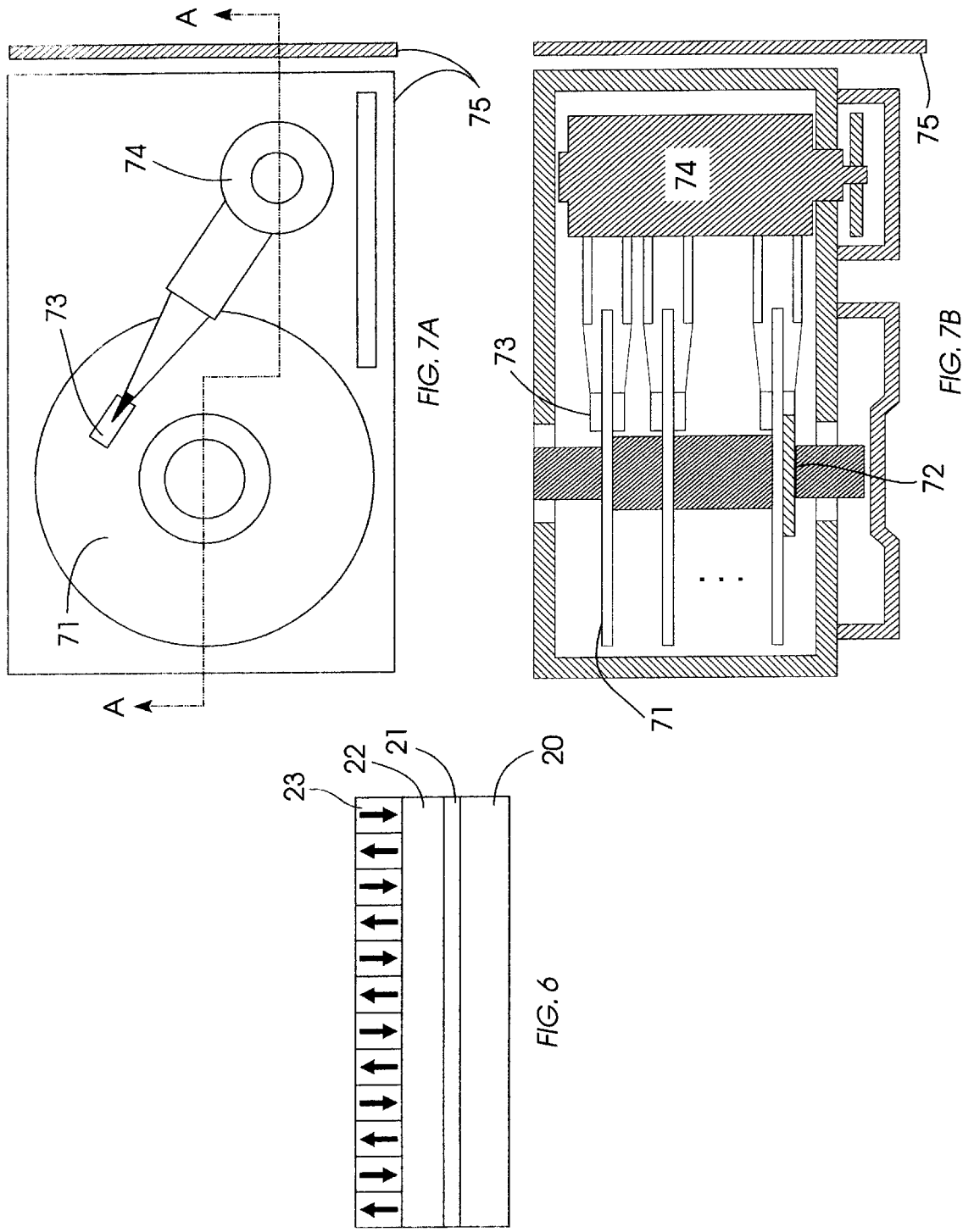

Dependence of S/N ratio and output on Pt content when Pt is added in a $Co_{72}Cr_{28}$ medium

5,863,631

PERPENDICULAR MAGNETIC RECORDING MEDIUM AND MAGNETIC RECORDING DEVICE USING THE SAME

FIELD OF THE INVENTION

The present invention relates to a perpendicular magnetic recording disk and a magnetic disk drive using it.

BACKGROUND OF THE INVENTION

Recently, in the field of recording devices such as a hard disk drive, it is more and more demanded to reduce the size of the hard disk drive and to increase its recording density. A perpendicular recording system is proposed as one of the approaches to increase the recording density of a recording medium. This system is attracting attention as a system replacing the longitudinal recording system.

A technology combining the perpendicular recording system with a head utilizing the magnetoresistance effect, such as an MR or a GMR head, has also been proposed. An article by the inventors of the present invention, "Perpendicular Magnetic Recording Using a Single-layer Medium and a Merged MR Head", *Journal of the Magnetics Society of Japan*, Vol. 19, Supplement, No. S2, 1995, reports characteristics of a single-layer Co—Cr perpendicular film as a recording medium which is indented to apply a merged MR head to a perpendicular recording system without modifying its write section. The composition of the single-layer Co—Cr perpendicular film described in the article has Co content of 78 at. % and Cr content of 22 at. %.

However, research by the inventors of the present invention revealed that the single-layer Co—Cr film consisting of the Co content of 78 at. % and the Cr content of 22 at. % used in the above conventional technology cannot provide sufficient maximum perpendicular magnetic interaction $(\Delta M\perp)_{max}$ when an MR head is used as the reproducing head. In view of the foregoing, the inventors of the present invention have continued their research and have found that the Co—Cr film exhibits unique $(\Delta M\perp)_{max}$ properties in a specific range of the contents of Co and Cr, within which the film has excellent properties as a perpendicular magnetic recording medium for an MR head.

Thus, the object of the present invention is to provide a perpendicular magnetic recording medium with favorable magnetic properties when a head utilizing the magnetoresistance effect is used.

SUMMARY OF THE INVENTION

In view of the above object, the first invention provides a perpendicular magnetic recording medium which comprises a perpendicular magnetic film formed on a substrate or a nonmagnetic film, Cr content of the perpendicular magnetic film being 22 at. % or higher but 30 at. % or less.

Here, a more preferable range of Cr content of the perpendicular magnetic film is 26 at. % or higher but 30 at. % or less.

In addition, the second invention provides a perpendicular magnetic recording medium which comprises of a perpendicular magnetic film formed on a substrate or a nonmagnetic film, Co content of the perpendicular magnetic film being 70 at. % or higher but 78 at. % or less.

Here, a more preferable range of Co content of the perpendicular magnetic film is 70 at. % or higher but 74 at. % or less.

Furthermore, the third invention provides a perpendicular magnetic recording medium which is a perpendicular magnetic film formed on a substrate or a nonmagnetic film, the composition of the perpendicular magnetic film being expressed as $(Co_{100-x}Cr_x)_{100-y}Pt_y$ in at. %, where $22 \leq x \leq 30$, $5 \leq y \leq 15$.

Here, a more preferable range of the composition of the perpendicular magnetic film is $26 \leq x \leq 30$, $6 \leq y \leq 10$ for $(Co_{100-x}Cr_x)_{100-y}Pt_y$.

BRIEF DESCRIPTION OF THE DRAWING

FIG. 6 is a sectional view of a disk perpendicular magnetic recording medium of another embodiment.

FIG. 7 is a plan view and a sectional view of a magnetic disk drive.

DETAILED DESCRIPTION OF THE INVENTION

Preferred Embodiment

Figure 1:
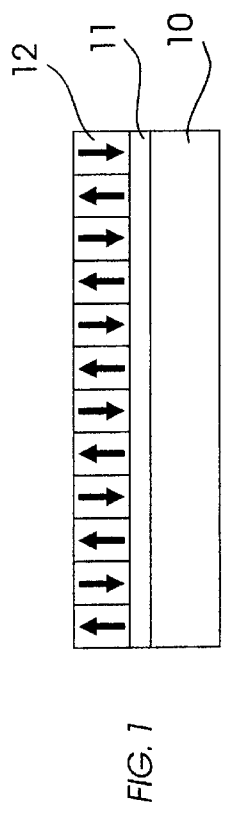
FIG. 1 is a sectional view of a disk perpendicular magnetic recording medium with a single-layer structure.

FIG. 1 is a sectional view of a perpendicular magnetic recording disk with a single-layer structure. A perpendicular magnetic film 12 as a recording layer is formed on a glass substrate 10 through an underlayer 11 consisting of Ti. The underlayer 11 is a layer for improving crystalline orientation of the perpendicular magnetic film 12, and may be omitted. The thickness of the perpendicular magnetic film 12 is 3000Å.

The perpendicular magnetic film 12 has the axis of easy magnetization in the direction of film thickness as indicated by arrows in the figure, and is of a Co—Cr layer. It should be noted here that a Co—Cr layer may become a longitudinal recording film depending on the content of Cr. When the content of Cr is low (for example, about 8 at. %), the axis of easy magnetization may be longitudinally oriented. Since various researches have been performed for the longitudinal recording, no more detailed discussion is given herein. In the embodiment, it is arranged to orient the axis of easy magnetization of the Co—Cr layer in the perpendicular direction by using Cr at the content described later.

The Co—Cr layer as the perpendicular magnetic layer 12 is formed by using a facing-target sputtering process with a substrate temperature of 200° C. and an Argon pressure of $5\times 10^{-3}$ Torr.

Figure 2:
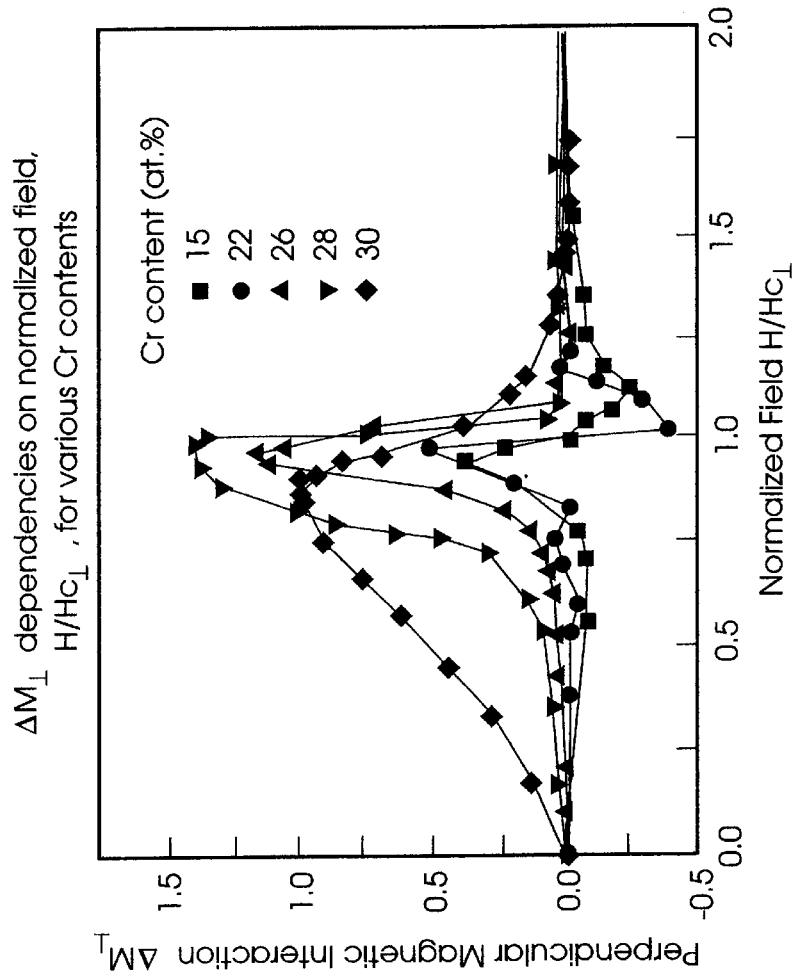
FIG. 2 are graphs illustrating relationships between external magnetic fields (H) and perpendicular magnetic interaction ($\Delta M\perp$) when varying the content of Cr.

FIG. 2 shows graphs illustrating relationships between external magnetic fields (H) and perpendicular magnetic interaction ($\Delta M\perp$) when varying the content of Cr contained in the Co—Cr layer, which is the perpendicular magnetic layer 12 thus formed. Here, measurement was made for cases where the content of Cr is 15, 22, 26, 28 and 30 at. %.

The external magnetic field (H) on the axis of abscissa is normalized by perpendicular coercive force ($H_c^{\perp}$).

In addition, the Cr contents of 15 at. %, 22 at. %, 26 at. %, 28 at. %, and 30 at. % are equal to 85 at. %, 78 at. %, 74 at. %, 72 at. %, and 70 at. % of Co content, respectively, when converted. While the following description is given on the basis of Cr content, and description is omitted for Co content, it is a matter of course that conversion to Co content can be made in the similar manner.

The maximum value of perpendicular magnetic interaction ($\Delta M\perp$) at each Cr content (the value on the axis of ordinate around 1.0 on the axis of abscissa) increases as the Cr content is increased from 15 at. %, and reaches the maximum of 1.4 at 28 at. %. It is found that the value conversely decreases as the content is further increased.

Then, the relationship between the Cr content and the maximum value of perpendicular magnetic interaction (($\Delta M\perp)_{max}$) is shown in FIG. 2. It will be appreciated that the maximum value of perpendicular magnetic interaction (($\Delta M\perp)_{max}$) gradually increases from 0.4 to 0.55 at the Cr content of 15 at. % to 22 at. %, and its inclination becomes sharp drastically at 22 at. % as a boundary. Also, it reaches the maximum value of 1.4 at 28 at. %, and then conversely decreases.

Figure 3:
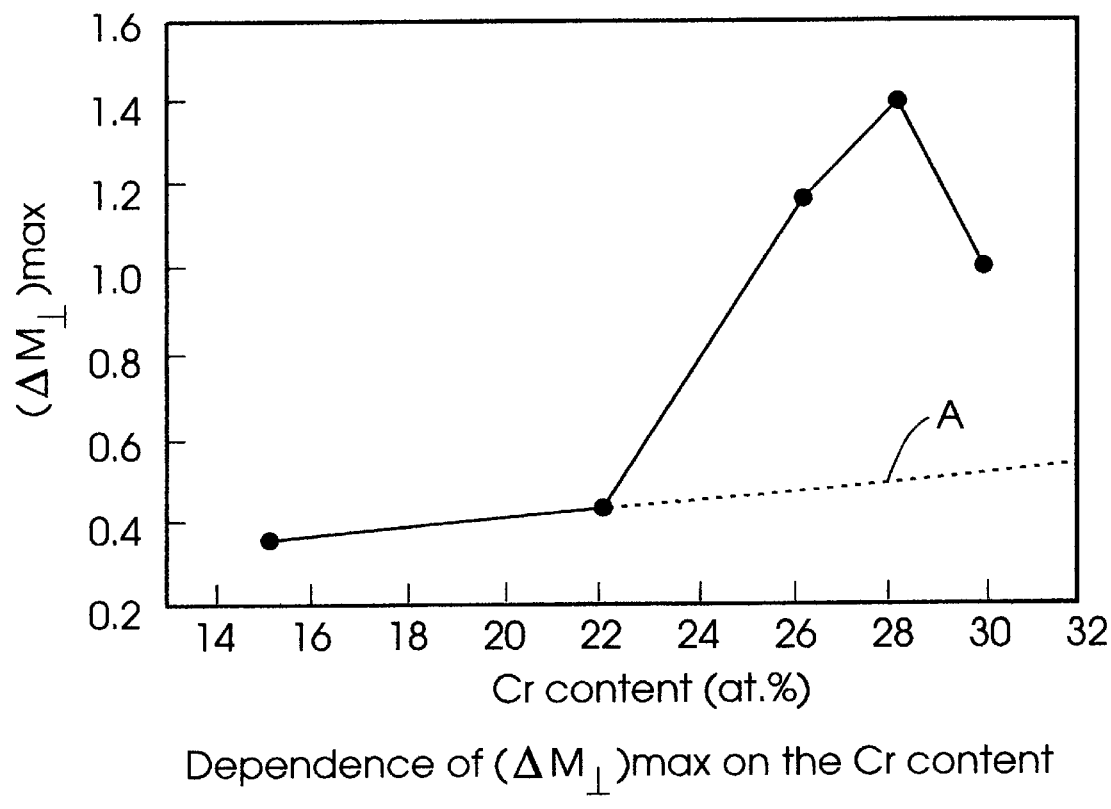
FIG. 3 is a graph illustrating Cr content and the maximum value of perpendicular magnetic interaction.

It was expected in the initial stage of this study that the relationship between increase of Cr content and the maximum value of perpendicular magnetic interaction (($\Delta M\perp)_{max}$) at the Cr content of 22 at. % or more would gradually increase with the same inclination as that of Cr content from 15 at. % to 22 at. % as shown by the broken line A in FIG. 3. However, we found that it actually increased with a sharp inclination at 22 at. % as a boundary, and that a very large maximum value of perpendicular magnetic interaction (($\Delta M\perp)_{max}$) could be obtained in a range higher than 22 at. %.

A larger maximum value of perpendicular magnetic interaction (($\Delta M\perp)_{max}$) is a very desirable property as the perpendicular magnetic recording medium. The perpendicular magnetic interaction is a parameter when a magnetic field is applied in a perpendicular direction to the film surface of a ferromagnetic material and measured, and represents a degree of magnetic interaction between adjacent particles in the film. A larger value causes particles lying in the perpendicular direction to easily behave as if they are a single particle, and easily produces a magnetized state aligned in the perpendicular direction in a region (for example, a region where one arrow exists in FIG. 1). Therefore, a larger maximum value is more desirable when it is used for a perpendicular recording medium because the magnetization is easily aligned in the perpendicular direction.

It is not clear the mechanism for why it drastically increases at the Cr content of 22 at. %. However, the maximum value of perpendicular magnetic interaction (($\Delta M\perp)_{max}$) drastically increases at the Cr content of 22 at. % to 28 at. % so that it was found to exhibit very good properties when used for the perpendicular magnetic recording medium. Furthermore, it was found that, although at the Cr content of 30 at. %, the maximum value of perpendicular magnetic interaction (($\Delta M\perp)_{max}$) decreased when compared with that at 28 at. %, it was larger than a value estimated from the broken line A in FIG. 3, and a favorable value as the properties for the perpendicular magnetic recording medium. Therefore, favorable properties in use for the perpendicular magnetic recording medium can be obtained in a range of Cr content larger than 22 at. % (note that 22 at. % is not included) but 30 at. % or less. Particularly, a range of Cr content of 26 at. % or more to 30 at. % is more preferable where the maximum value of perpendicular magnetic interaction (($\Delta M\perp)_{max}$) is about 1.0.

Figure 4:
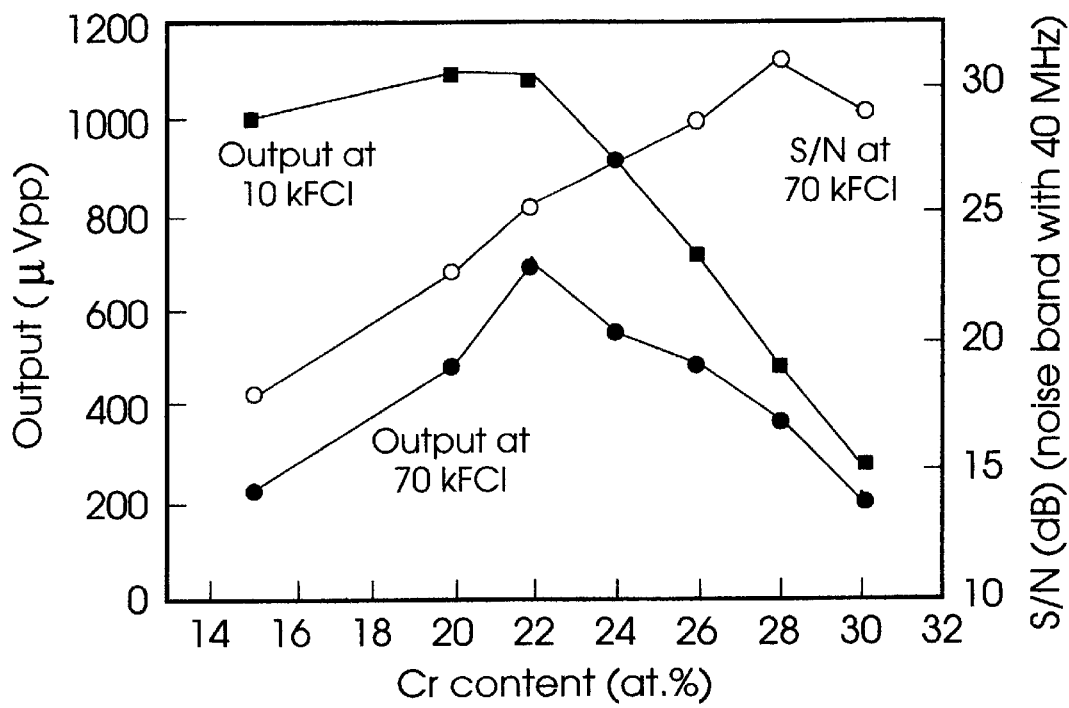
FIG. 4 is a graph showing the relationship between Cr content, output and S/N.

FIG. 4 is a graph showing the relationship between Cr content, output, and S/N. In the figure, the left axis of ordinate represents output, while the right axis of ordinate represents S/N (ratio of reproduced signal to noise). In addition, FCI of 10 kFCI and 70 KFCI in the figure means "Flux Charge per Inch", and represents recording density. In the experiment for determining S/N, peripheral speed of the disk is 8.29 m/s, recording density of data is 70 kFCI, and the amount of noise is an integral amount measured at 40 MHz band by using a spectrum analyzer. In addition, trackwidth and shield gap length are 2.5 $\mu$m and 0.3 $\mu$m, respectively, while the head's flying height is 62 nm.

As seen from the figure, S/N increases as the Cr content increases, and reaches its maximum value of 32 dB at the Cr content of 28 at. %. Then, it slightly decreases at 30 at. %. On the other hand, as for the output, it increases up to the Cr content of 22 at. %, and decreases thereafter.

When it is intended to use an inductive-type head as the reproducing head, it is not favorable if it does not have output characteristics higher than those shown in FIG. 4. However, a head utilizing the magnetoresistance effect, such as an MR head, a GMR head, or a spin valve head has much higher sensitivity than the inductive-type head. Accordingly, it is possible to utilize such a head as the reproducing head even for the perpendicular magnetic recording medium which has the output characteristics decreasing at the Cr content of 22 at. % to 30 at. %. In addition, while the head utilizing the magnetoresistance effect is susceptible to noise because it has high sensitivity, since S/N is 25 dB or more in a range from 22 at. % or more to 30 at. % or less, even the head utilizing the magnetoresistance effect can be sufficiently utilized.

Particularly, a range of Cr content higher than 26 at. % but 30 at. % or less is a preferable range utilizing such a head because such a range provides S/N of 28 dB or more.

Figure 5:
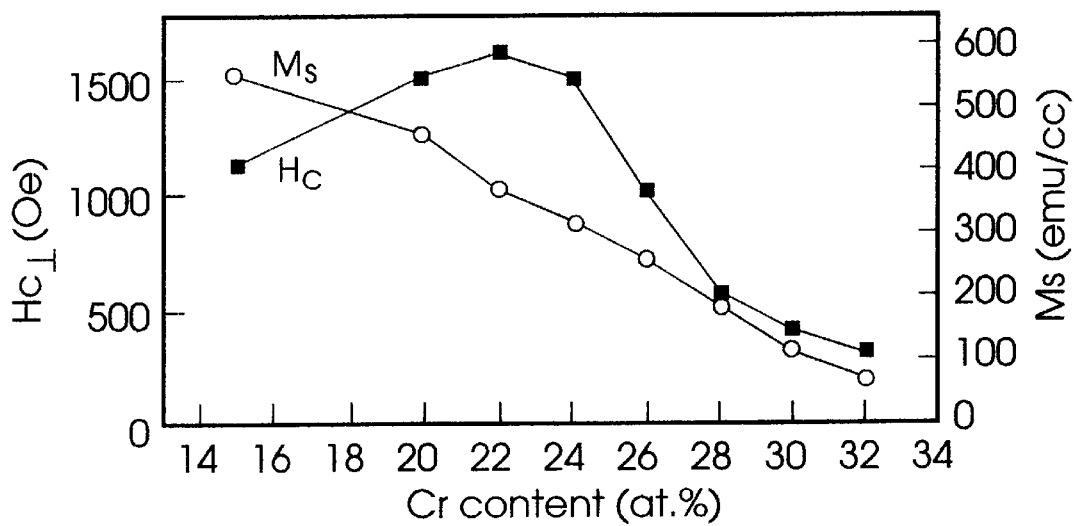
FIG. 5 is a graph showing the relationship between Cr content, coercive force in the perpendicular direction ($H_c$), and saturation magnetization ($M_s$).

FIG. 5 is a graph showing the relationship between Cr content, coercive force in the perpendicular direction ($H_c$), and saturation magnetization ($M_s$). In the figure, the saturation magnetization gradually decreases along the Cr content, and is 100 emu or more but 200 emu or less in a range of Cr content from 26 at. % or more but 30 at. % or less.

Figure 9:
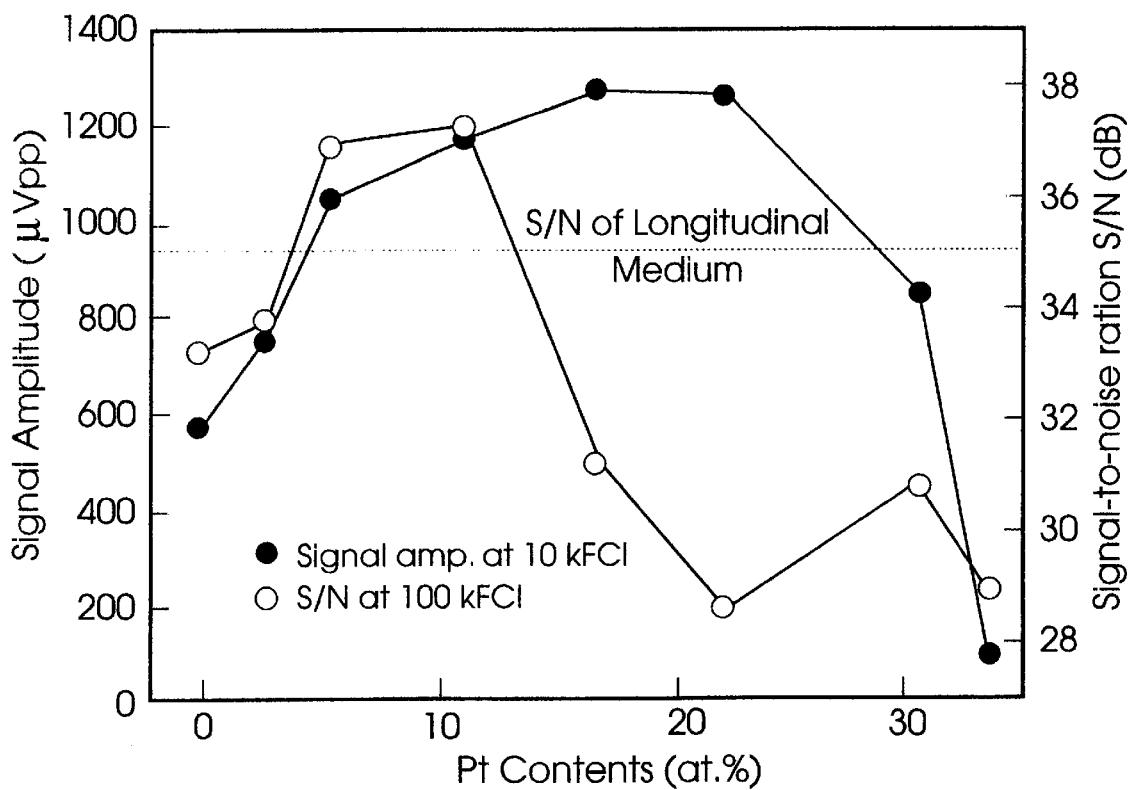
FIG. 9 is a graph showing the dependence of S/N ratio and output on Pt content when Pt is added.

For the improvement of S/N ratio shown in FIG. 4, the output reduces half around 28% from that at 22%, so that sufficient output cannot be obtained when the trackwidth is narrowed down. Thus, Pt which is expected to increase the output is added in the low noise medium with much Co content. FIG. 9 shows the output and S/N ratio when Pt is added in a medium of $Co_{72}Cr_{28}$. It is observed that the output steeply increases as Pt is added.

However, the SIN ratio conversely reduces around Pt 18% where the output is at the maximum. Rather, the highest S/N ratio is observed in a range of 5% or more but 15% or less. A preferable result is obtained from 6% to 10%. The S/N ratio of the same head when it is used for a longitudinal magnetic recording medium currently in use is the value indicated by the dotted line in the figure. It is possible to obtain values higher than them by about 2 dB. In addition, these results are values obtained from a very thick thickness as thickness as 300 nm. This thickness is believed to contribute to stabilization of magnetic recording in the future.

From these results, a perpendicular magnetic recording medium with a composition of $(Co_{100-x}Cr_x)_{100-y}Pt_y$ in at. %, where $22 \leq x \leq 30$, $5 \leq y \leq 15$, and with a film thickness of 100 nm or more, is very promising as a high density recording medium in the future. (Furthermore, $26 \leq x \leq 30$, $6 \leq y \leq 10$ provides more significant effect.)

Figure 10:
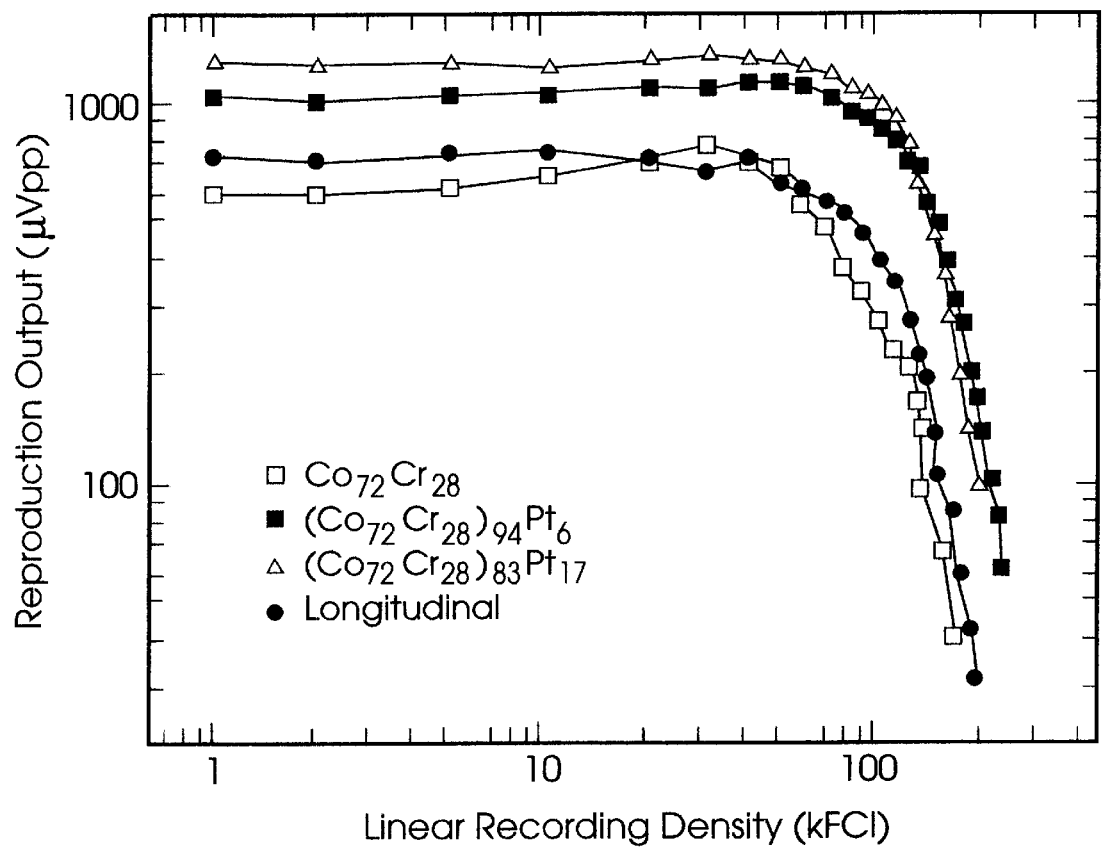
FIG. 10 is a graph showing the relationship between linear recording density and reproduction output when Pt is added.

FIG. 10 shows the relationship between linear recording density and reproduction output when Pt is added. Referring to FIG. 10, it is found that the reproduction output is poorer than the longitudinal recording system when only Co and Cr are used (no Pt is added), and that addition of Pt considerably increases the reproduction output over the longitudinal recording system.

In addition, when the linear recording density is increased over 100 kFCI, the longitudinal recording medium and a medium not containing Pt exhibit earlier reduction of output, while media containing Pt of 6% and 17% maintain a high output for higher linear recording density. The one containing 6% particularly provides the best characteristics. This shows that a medium containing Pt of 5–15% can provide the highest recording density.

Thus, referring to FIGS. 9 and 10, it can be understood that the reproduction output and the SIN ratio are at the best balance around Pt content around 5–15 at. %.

In addition, addition of Ta instead of Pt is expected to provide similar effect.

In addition, the recording layer may be of a laminated layer structure. FIG. 6 is a sectional view of a disk perpendicular magnetic recording medium of a laminated layer structure. An Ni—Fe layer 22 as the recording layer and a Co—Cr layer 23 as the perpendicular magnetic film are formed on a glass substrate 20 through an underlying layer 21 consisting of Ti. The underlying layer 21 is a layer provided for improving the crystalline orientation of the perpendicular magnetic film 12, and may not be provided.

FIG. 7 is a plan view and a sectional view of a magnetic disk drive. The magnetic disk drive comprises the above-mentioned perpendicular magnetic recording medium 71, a perpendicular magnetic recording medium drive 72 for driving the perpendicular magnetic recording medium 71, and a magnetic head section 73 containing an MR head for reproducing data recorded on the perpendicular magnetic recording medium 71. Then, the magnetic head 73 is driven by a magnetic head actuator 74. Moreover, there is provided a record reproduction signal processing circuit 75.

Figure 8:
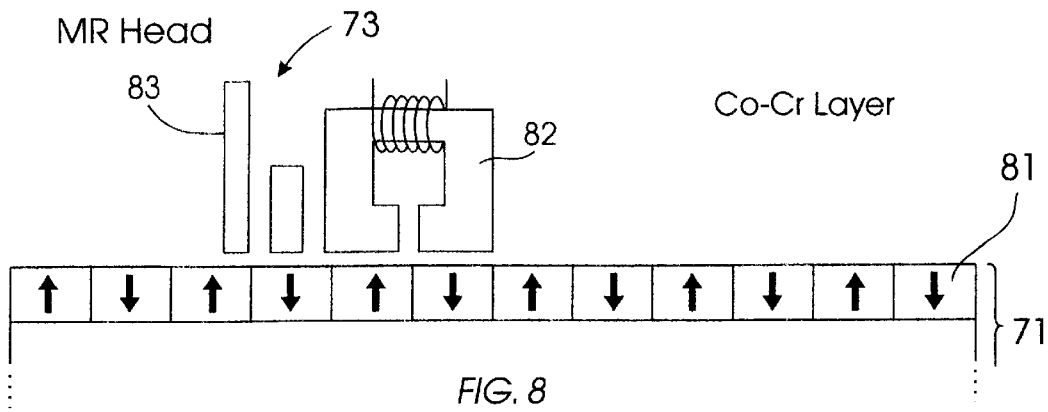
FIG. 8 is an enlarged view of the perpendicular magnetic recording medium and the magnetic head section.

FIG. 8 is an enlarged view of the perpendicular magnetic recording medium 71 and the magnetic head section 73. The perpendicular magnetic film 81 of the perpendicular magnetic recording medium 71 is recorded with data by an inductive-type head 82 in the magnetic head section 73. On the other hand, data recorded on the perpendicular magnetic film 81 is reproduced by an MR head 83.

Advantages of the Invention

As described, in a perpendicular magnetic recording medium using the Co—Cr layer as the perpendicular magnetizing film, good perpendicular magnetic interaction as the properties for the perpendicular recording medium can be obtained in a range of Cr content of higher than 22 at. % but 30 at. % or less (Co content of 70 at. % or more but 78 at. % or less when converted to Co). Since in this range, although the output is low, good S/N can be obtained, such perpendicular magnetic recording medium is preferable as a medium for a reproducing head utilizing the magnetoresistance effect. Particularly favorable properties can be obtained in a range of Cr content of 26 at. % or more but 30 at. % or less (a range of Co content of 70 at. % or more but 74 at. % or less).

In addition, Pt of 5–15 at. % is added in a composition of Co and Cr, two parameters of the S/N ratio and the reproduction output can be expected to be improved so that balanced characteristics as a magnetic recording medium can be obtained. In particular, a more significant effect can be obtained when Pt is added by 6–10 at. %.

What is claimed is:

1. A perpendicular magnetic recording medium comprising a substrate and a perpendicular magnetic film formed over the substrate, wherein the composition of said perpendicular magnetic film is $(Co_{100-x}Cr_x)_{100-y}Pt_y$, in at. %, where $26 \leq x \leq 30$ and $6 \leq y \leq 10$, and wherein the saturation magnetization of said perpendicular magnetic film is 100 emu or more but 200 emu or less.

2. A magnetic recording disk drive comprising:
   a perpendicular magnetic recording disk comprising a substrate and a perpendicular magnetic film formed over the substrate, the film containing Co and Cr, where Cr is present in the range of 26 to 30 at. % and wherein the saturation magnetization of said perpendicular magnetic film is 100 emu or more but 200 emu or less;
   means for rotating the disk;
   a magnetoresistive head for reading data from the perpendicular magnetic film of said rotating disk; and
   means for positioning said head at a desired track on said disk.

* * * * *